Figure 1:
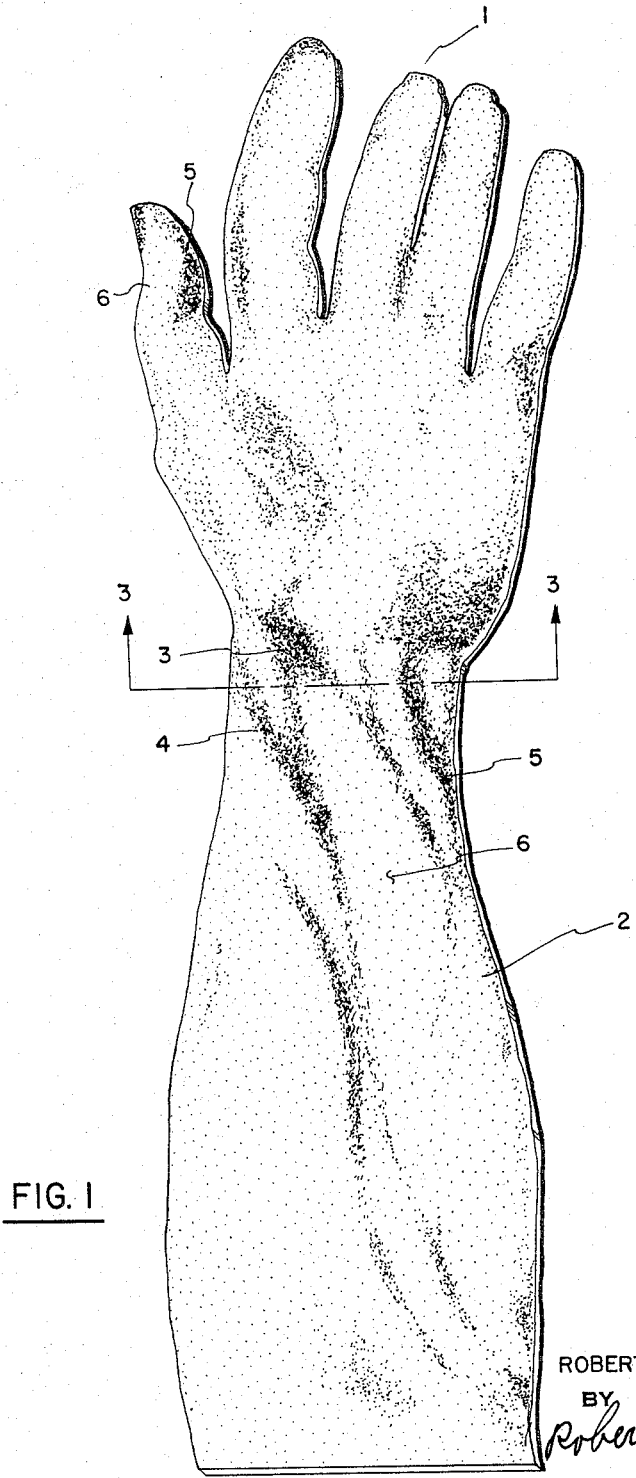

July 25, 1967     R. B. BARNES     3,333,103
THERMOGRAPH EXPOSURE STANDARD COMPRISING A BASE OF
LOW INFRARED EMISSIVITY AND A COATING OF
HIGH INFRARED EMISSIVITY Filed July 14, 1964     3 Sheets-Sheet 1

FIG. I

INVENTOR
ROBERT BOWLING BARNES

INVENTOR
ROBERT BOWLING BARNES
BY *Robert Ames Norton*
ATTORNEY

INVENTOR
ROBERT BOWLING BARNES

ATTORNEY

United States Patent Office 3,333,103
Patented July 25, 1967

3,333,103
THERMOGRAPH EXPOSURE STANDARD COMPRISING A BASE OF LOW INFRARED EMISSIVITY AND A COATING OF HIGH INFRARED EMISSIVITY
Robert Bowling Barnes, Stamford, Conn., assignor to Barnes Engineering Company, Stamford, Conn., a corporation of Delaware
Filed July 14, 1964, Ser. No. 382,612
10 Claims. (Cl. 250—84)

This invention relates to standard exposure objects for thermography.

Thermography, that is to say the taking of a picture of a surface by its infrared radiation, has achieved large success. One of the most important fields is the thermography of the human skin or skins of other warm blooded animals which has been extensively used for medical diagnosis. Thermography is effected by scanning an infrared detector across the surface to be thermoraphed in the form of a raster and transforming the infrared signal into varying brightness of a source of visible light which is then scanned, usually by elements attached to the main scanning system, onto suitable photographic film. The resulting picture or thermogram shows the warmer spots in relatively lighter shades and cooler spots as darker shades or black.

The ordinary thermograph has two controls which are similar or at least analogous to the brightness and contrast controls of a television receiver. The first control determines the average temperature which will be recorded in the middle of the scale from black to white on the final thermogram. The second control varies the overall amplification of the signal from the infrared detector and so determines how large a range of temperatures will be interpreted between black and white in the final thermogram. In medical thermography usually the range is quite narrow, for example, about 10° F., and the contrast may be considered as high. The brightness control is, of course, set for the particular temperature which is to be recorded at a particular point in the range from black to white which is often referred to as the gray scale of the thermogram.

With the high contrast of medical thermography it is necessary to test or calibrate the thermograph from time to time by making standard exposures and comparing them with standard thermograms made in the past. Hitherto this has been effected by exposing standard subjects, for example, the hand and forearm of a particular person. However, this has created certain problems.

First of all the thermogram will differ with different individuals. For instance important parts of the thermogram are the blood vessels at the wrist and these may show darker or lighter in different individuals depending on the thickness of the fat or other tissue between the blood vessel and the skin. Also it is inconvenient as well as inaccurate to use thermograms of individuals as calibration devices. Not only is there the difference from individual to individual as referred to above but the ambient temperature and other factors may, and often do, vary as does the skin temperature of the same individual at different times.

The drawbacks to the use of thermograms of actual persons are completely eliminated by the present invention. Essentially the present invention requires two major constituents. The first is a substrate of high thermal conductivity and of sufficient thickness so that it behaves as a heat sink. Aluminum is preferred as in thicknesses of a ½" or so it has rigidity, high heat conductivity and thermal mass and so is a good heat sink. The invention is, of course, not limited to the use of aluminum and any other material of high heat conductivity can be used. The substrate must have one further characteristic, that is that the surface from which the test exposure is made must not be a specular reflector. The reasons for this will be brought out below in further more specific description of the invention. A diffusely reflecting surface is easily prepared by sand blasting or other conventional procedures. While the substrate surface must not be a specular reflector, it must be a good diffuse reflector which is the same thing as saying that it must have low emissivity in the far infrared.

Finally there must be some means for maintaining the substrate at a predetermined temperature, for example, a temperature approximating the skin temperature of a patient. This requires ordinarily some means of heating which can be accurately controlled, preferably thermostatically. In other words, the surface of the heat sink must be the same temperature in different portions.

The second requirement, which is more a major one, is that there be on the surface a pattern of different emissivities. This pattern, as will be brought out in greater detail below, should be an image of a standard thermogram, that is to say the portions of the surface which, after being thermographed, are to be light, must be areas of higher emissivity and those areas which are to be thermographed dark must be of lower emissivity ranging down to the very low emissivity of the diffusely reflecting substrate itself which, in the case of sand blasted or other matte surfaced aluminum will usually be of the order of 10 percent. While in terms of emissivity the pattern or image is positive, under visible light will often appear negative as many materials which have high emissivity in the far infrared are also dark colored under visible light. This is not a necessary limitation for there are also many organic and some inorganic materials which have high emissivity in the far infrared and are either light colored or actually transparent in the visible.

The best way of forming the pattern or image on an aluminum substrate is by anodizing and then photo-etching, preferably by a half tone process. The invention is not limited to this process and the pattern can be produced by other means such as spraying or painting. The basic pattern should preferably be in materials which are durable and not easily washed off. However, as will be pointed out below it is often desirable to apply to restricted areas a temporary image or pattern which can be in water dispersable material and washed off after use.

When the test object of the present invention is compared with an actual subject such as skin of a patient it will be seen that the mechanism of transforming the pattern into radiation for the thermograph is exactly the reverse of the normal. Instead of having a pattern or image the areas of which are at different temperatures but which may, and in the case of human skin in the far infrared will, have uniform emissivity, in the present invention there is uniform temperature and the pattern or image is in varying amounts of emissivity. As far as the far infrared detector in a thermograph is concerned it cannot distinguish whether different amounts of radiation, watts/cm.² are produced by different temperatures of a surface of constant emissivity or different emissivities on a surface o constant temperature.

At first glance it seems as if the present invention woul not work because radiation is linearly proportional t emissivity but proportional to a high power of absolute temperature, the fourth power for overall radiation. However, in the case of the present invention the thermograms have a fairly narrow temperature range and what we are concerned with is not the absolute temperature but the small changes of temperature ΔT. Particularly for thermography of the human skin the temperature range is sufficiently small so that a thermogram of the test exposure object gives an accurate representation of a thermogram of a real object where the areas differ in temperature.

Another important variant of the present invention involves an improved gray scale for determining exposure. The original thermographs generated a series of shades of gray on one side of the thermogram by means of an internal generator. This proved unreliable in some cases because the generation was effected by modulating the glow tube artificially and was not influenced by any changes in the thermograph optics such as dust, filter changes and the like.

A marked improvement in gray scales was developed and forms the subject matter of the patent of Schwarz and Banca, No. 3,283,148 issued November 1, 1966. In this patent there is described and claimed a series of small surfaces of uniformly high emissivity in the far infrared. Each surface is maintained at a different definitely predetermined temperature or a uniform temperature is used with each surface having a different filter through which radiation passes. Usually the surfaces are mounted in a box and temperature controls are provided. The box is then placed at one side in the field of view of the thermograph and appears as a gray scale on the final thermogram. Since it is thermographed through the same optics as the subject itself all changes involving the optics, detector sensitivity and the like are eliminated.

In spite of the large advance in precision which resulted from the external gray scale certain problems arose. The most important was the difficulty of maintenance and control of different exact temperatures or exact radiation from each of the various surfaces of the external gray scale. In case of a failure which might result in one or more steps not being heated or heated to an incorrect temperature this could only be discovered after a thermogram had been made. Also, the control of temperature becomes more and more difficult the nearer the temperature approaches to ambient temperatures. It was difficult to maintain sufficiently precise control of the various temperatures or filter transmission and sometimes a wrong or slightly wrong gray scale resulted.

According to the present invention a gray scale is made up of stripes or other small areas of precisely determined emissivities. The same type of substrate is used as described above and in fact the gray scale may be on a portion of the substrate for the main test object. On thermographing, the areas of the gray scale are accurately reproduced and all of the advantages of the Schwarz and Banca gray scale are obtained without requiring separate heating controls or the other difficulties set out above. Since the test object is preferably maintained at about the temperature of a patient's skin or other surfaces to be thermographed this is substantially above ambient temperature and assures a reliable control.

The preferred durable, permanent emissivity contours or patterns also permit another desirable characteristic. The test object is useful not only for calibration purposes but also for instruction. It is possible to show not only standard conditions but special conditions. Thus, if the test object represents a woman's torso a simulated breast cancer can temporarily be put on the object in transparent, water dispersable material of high emissivity. This will not appear under visible light but it will show up as an area of high emissivity in the far infrared. An operator, therefore, can acquire experience in locating such conditions in a thermogram without knowing ahead of time that they have been set up on the test object. After use the temporary pattern can be washed off. It is also possible to simulate relatively cold areas by a water dispersable material, for example, water itself, which has relatively low emissivity. This may be used to simulate vascular occlusions such as those producing gangrene which result in a colder area on the patient's skin. It is also possible to introduce a small spot of low emissivity in a temporary pattern of high emissivity such as a cancer which would simulate a small area of necrosed tissue in the cancer. The training possibility is useful not only for a new operator but also for training physicians in interpreting thermograms.

Figure 2:
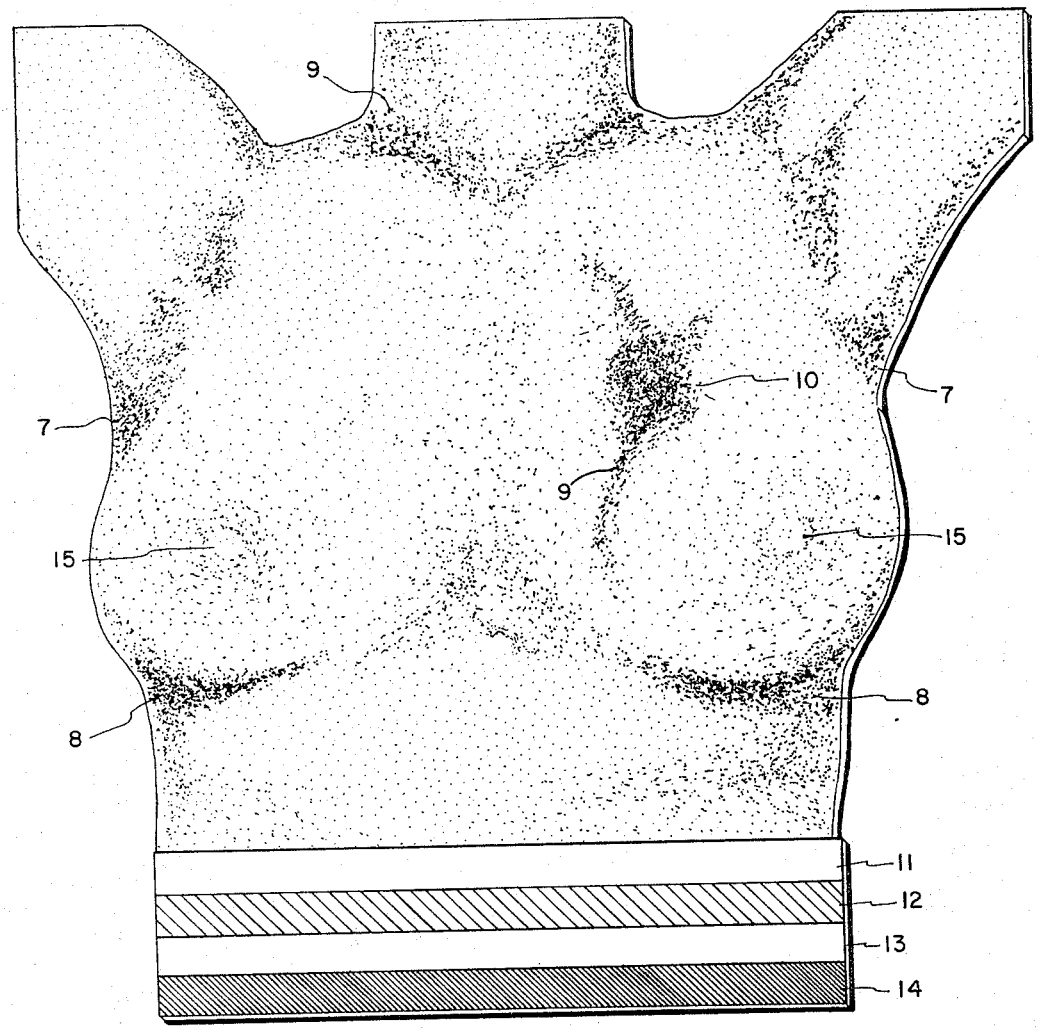
Figure 3:
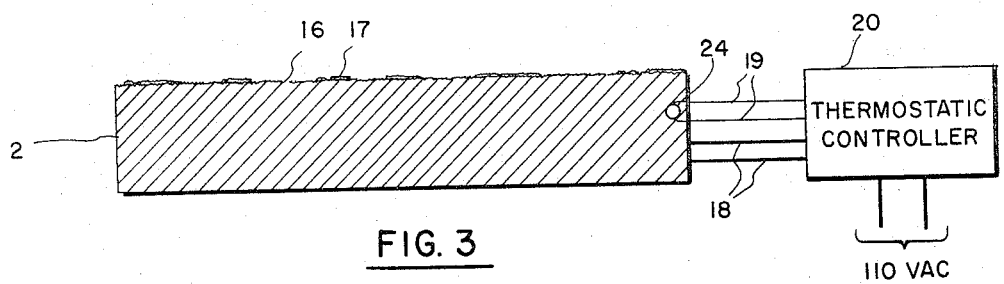
Figure 4:
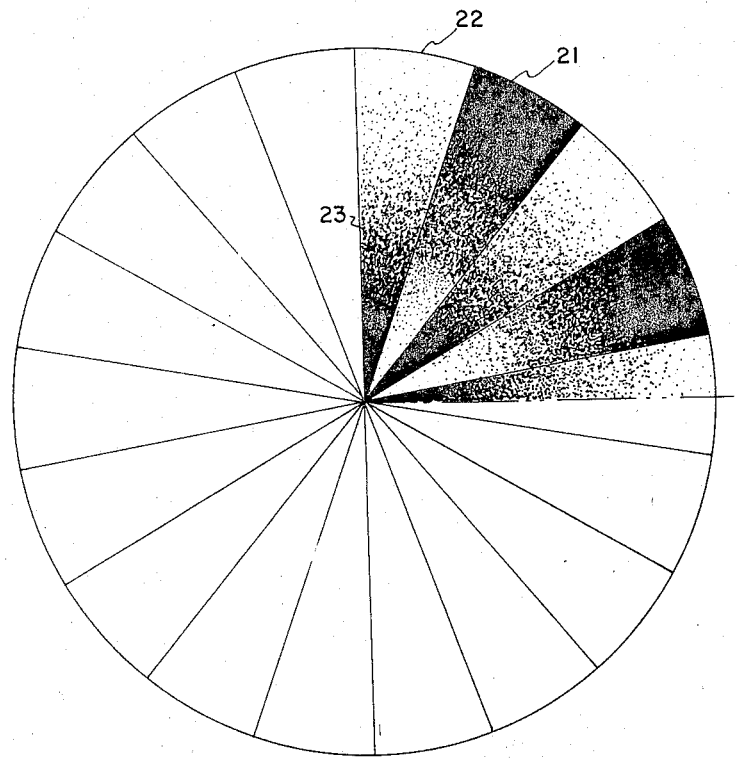

The invention will be described in greater detail in conjunction with the drawings in which:

FIG. 1 is a plan view of a silhouette of a hand and forearm;
FIG. 2 is a similar silhouette of a woman's torso;
FIG. 3 is a section along line 3—3 of FIG. 1 and
FIG. 4 is a different form of test pattern.

In FIG. 1 the arm portion is shown at 2 and the fingers at 3. The two blood vessels near the surface of the wrist appear as relatively heavy or continuous thickness or of a material of high emissivity, for example a pigmented lacquer, and other spots on the hand and arm which in an ordinary thermograph will appear as lighter or darker are illustrated at 5 and 6, the former being darker areas and the latter lighter areas using the term in the sense of the appearance on the final thermogram. In this sense, of course, the blood vessels 3 and 4 constitute light areas, As the areas of the high emissivity are colored they appear darker on the drawings and, therefore, constitute visually a negative image of the final thermogram.

The aluminum substrate 1 is advantageously from ½ to ¾ of an inch and is very stiff but yet fairly light. The surface is sand blasted so that it does not reflect specularly but is, nevertheless, of low emissivity. The surface is then anodized and the pattern produced by preparing a typical thermogram of a hand and arm under standard conditions. This image is then transferred as a negative on the anodized surface by a half tone process followed by etching.

It is desirable to make test exposures under thermal conditions approximating normal skin temperature. The thermograph exposures are then made and accurate adjustment of the machine effected. The test object is available for comparison during the life of the thermograph.

A satisfactory method of producing the contours is shown in FIG. 3 which is a section through FIG. 1. The surface of the aluminum is sand blasted until it is sufficiently rough so that it is a diffuse reflector and not a specular reflector. The aluminum is then anodized to produce a coating which is of high emissivity in the infrared but does not necessarily have to be black by visible light. The contours of the hand and forearm of FIG. 1 are then etched through the anodizing, for example, by a half tone method. In FIG. 3 a light portion at 16 will show a relatively large area of the diffusely reflecting sand blasted aluminum surface. Then an area of higher emissivity 17 is reached. No attempt is made in FIG. 3 to show these areas as sections through a half tone. They are shown solid and, of course, the roughness of the sand blasted aluminum surface is very greatly exaggerated as is the thickness of the anodizing coating.

The whole block is provided with heating wires (not shown), which connect to two power wires 18 leading to a thermostatic controller 20 of conventional design. This is controlled by an imbedded temperature sensing element 24, such as an insulated thermistor bead, which is connected to the thermostatic controller through the control wires 19. No details of the controller are shown as this is a conventional device, the particular design of which forms no part of the present invention.

A one piece, solid aluminum substrate is illustrated but, of course, the surface may be formed on thinner aluminum and thermally bonded to a thicker piece of aluminum.

As the image of the hand and arm is a positive emissivity image of a thermogram when the test object is thermographed there is reproduced a standard exposed thermogram of an actual hand and arm. Since the positive image in terms of emissivity is unchanging, and durable, reliable and reproducible test exposures are obtainable.

As pointed above, it is desirable to make test exposures under ambient conditions which approximate those in which actual thermograms would be taken. Thus, for example, in medical work the test hand and arm can be removed from its filing place and then warmed well above ambient temperature. The thermograph exposures are then made and accurate adjustment of the machine and comparison with results previously obtained during lifetime of the thermograph can be made.

Because of the fact that a hand and arm has typical, readily recognizable patterns of temperature, it is a desirable shape for the test object but, of course, the invention is not in any sense limited thereto and in the special cases such as, for example, where the thermography is to be used primarily for other purposes, such as breast cancers, vascular blockages and the like, test objects of different shapes with images corresponding to those objects will be used.

FIG. 2 illustrates a woman's torso. It is also on a thick aluminum substrate as in FIG. 1. The emissivity contours accurately reproduce those found when a woman with normal breasts is thermographed and show, for example, different farmer areas such as the area under the arm at 7, the warmer skin fold below each breast at 8 and some prominent blood vessels near the surface at 9. The figure also shows an artificially represented breast cancer at 10. For example, this area is made with water organic dispersable colorless material and can be removed by washing or wiping off with a damp sponge or cloth.

At the bottom of the torso there are a series of stripes 11 and 13 which are reflecting and stripes 12 and 14 of increasing emissivity shown symbolically as a spacing of lines. When the thermograph is taken these stripes appear as a gray scale and are, of course, thermographed through the thermograph optics with the increased reliability set out above.

Of course, striped areas can be provided in the hand and forearm shown in FIG. 1 and it is possible to have the stripes on a separate piece of aluminum so that it can be moved around for special exposure purposes. In this case, however, the temperature must be maintained constant. However, this requires only a single temperature control for the whole thick piece of aluminum which can be maintained at the same temperature by conventional thermostatic means as described in connection with FIG. 3 above. There is no problem of maintaining a number of different temperatures constant which creates the principal drawback to the Schwarz and Banca external gray scale. Only two emissivity stripes are shown although in an ordinary gray scale there will usually be ten or more. However, the smaller number makes the drawing clearer.

The gray scale described shows alternate stripes of low emissivity. As far as the reproduction of a gray scale on a thermogram is concerned these low emissivity stripes are not needed. However, they are useful for a new electronic calibration which forms no part of the present invention. It should be noted that with the gray scale at a single temperature, the highest one needed, and controlled emissivity patterns, the resulting thermogram can be made to represent accurately different temperatures as has been described above. The emissivity steps may correspond to any desirable series of $\Delta T$'s such as a linear series, logarithmic series, etc. Since the test surface is permanent, the gray scale remains constant and accurate as a percentage of the absolute temperature of the test object.

FIG. 4 illustrates a test pattern which, when thermographed, permits testing resolution as well as gray scale. The test pattern, which is reminiscent of early television test patterns, is in the form of a sun burst with alternate bars 21 and 22. The former are of maximum emissivity at the ends with a progressively lower and lower emissivity as the center is approached. The bars 22 are the opposite having the highest emissivity near the center and the lowest emissivity at the ends. At an intermediate position 23 the emissivity of each type of bar is the same. In order to simplify the drawing only one quadrant of the full pattern is shown but, of course, in practice it extends all the way around to form a perfect sun burst.

The test pattern of FIG. 4 has the advantage that it can test optical resolution as well as constitute a gray scale. Optical resolution, alignment of the thermograph, is tested in the same manner in a television test pattern by noting how near to the center there is a complete resolution in the resulting thermogram. Thermal resolution in terms of the smallest detectable $\Delta T$'s will be shown by the width of the circle 23 where the emissivities of the two patterns are equal or nearly equal.

The test objects described above are for medical thermography which is the field of greatest practical interest. It is, of course, possible to prepare test exposure objects for other types of thermography such as the examination of printed circuits. A pattern can be simulated in varying emissivity including standard faults such as overheated components, short circuits, etc. Such a test object can be used to train thermographers for quality control or reliability testing. Other forms of test objects for particular purposes can be prepared and are included in the invention.

I claim:
1. A test object for calibration of infrared thermographs comprising in combination,
 (a) a test object of normally low emissivity, whose surface of rough and, therefore, a diffuse refector, the object being of thick material of high heat conductivity, the thickness being so great that the object behaves as a heat sink, and
 (b) a positive image on the surface of the test object in a material of high infrared emissivity, the positive image being of a standard positive thermogram which is to be reproduced on test exposure.

2. A standard test object according to claim 1 in which the object is of thick matte aluminum.

3. A test object according to claim 2 in which the object is in the shape of a hand and forearm.

4. A test object according to claim 2 in which the object is in the shape of a woman's torso.

5. A test object according to claim 4 in which a design representing in varying emissivity the skin over a malignant tumor is provided, the design being temporarily applied to the test object in a form removable without destroying the positive image on the test object.

6. A test object according to claim 1 in which a temporary representation of a particular condition is present in a restricted area of the test object in a form which can be removed from the test object without destroying the underlying pattern thereof.

7. A test object according to claim 6 in which the positive image is in material which is durable and not soluble, and the temporary and restricted area is in the form of a restricted pattern in soluble material which can be removed by solution.

8. A test object for producing a gray scale in the form of areas of progressively different known emissivities on a substrate of thick material of high heat conductivity and low emissivity but roughened surface, the areas of differing emissivity being arranged to form a gray scale on a thermogram when thermographed.

9. A test object according to claim 8 in which the substrate is thick aluminum thermostatically maintained at a predetermined temperature.

10. A test object according to claim 8 for measuring resolution as well as producing a gray scale in which the areas of different emissivities are in the form of a circle divided into a plurality of pie shaped areas by radii, alternate areas having low emissivity at the center and increasing emissivity toward the periphery and the reverse, the emissivity gradients being uniform in each section so that they produce a circle intermediate the center and periphery of equal emissivity in each area.

References Cited
UNITED STATES PATENTS

| | | | |
|---|---|---|---|
| 2,209,304 | 7/1940 | Alder | 165—133 X |
| 2,895,049 | 7/1959 | Astheimer et al. | 250—65 |
| 3,227,879 | 1/1966 | Blau et al. | 250—84 |

RALPH G. NILSON, *Primary Examiner.*
ARCHIE R. BORCHELT, *Examiner.*
W. F. LINDQUIST, *Assistant Examiner.*